(12) United States Patent
Hirato

(10) Patent No.: US 10,809,574 B2
(45) Date of Patent: Oct. 20, 2020

(54) LIQUID CRYSTAL ALIGNMENT AGENT, LIQUID CRYSTAL ALIGNMENT FILM, AND LIQUID CRYSTAL DISPLAY DEVICE

(71) Applicant: SHARP KABUSHIKI KAISHA, Sakai, Osaka (JP)

(72) Inventor: Shinichi Hirato, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 94 days.

(21) Appl. No.: 16/261,522

(22) Filed: Jan. 29, 2019

(65) Prior Publication Data

US 2019/0233731 A1 Aug. 1, 2019

(30) Foreign Application Priority Data

Jan. 30, 2018 (JP) .................................. 2018-013986

(51) Int. Cl.
*G02F 1/1337* (2006.01)
*C09K 19/56* (2006.01)

(52) U.S. Cl.
CPC ........ *G02F 1/133723* (2013.01); *C09K 19/56* (2013.01); *G02F 1/133788* (2013.01); *Y10T 428/1023* (2015.01)

(58) Field of Classification Search
CPC ............... C09K 19/56; G02F 1/133723; G02F 1/133788; Y10T 428/1023
See application file for complete search history.

(56) References Cited

U.S. PATENT DOCUMENTS

| 6,063,829 A | 5/2000 | Endou et al. |
| 2015/0105503 A1* | 4/2015 | Ooki .................... C08K 5/353 524/94 |

FOREIGN PATENT DOCUMENTS

| JP | 3893659 B2 | 3/2007 |
| JP | 6056187 B2 | 1/2017 |
| WO | 2010/092989 A1 | 8/2010 |

* cited by examiner

*Primary Examiner* — Sophie Hon
(74) *Attorney, Agent, or Firm* — ScienBiziP, P.C.

(57) ABSTRACT

The present invention provides: (A) a liquid crystal alignment agent containing a polyamic acid which is a polymer of a tetracarboxylic dianhydride represented by a predetermined formula and any one of diamines represented by predetermined formulas, or a derivative of the polyamic acid; (B) a liquid crystal alignment film containing a polyimide compound represented by a predetermined formula, which is an imidization product of the polymer in the liquid crystal alignment agent; and (C) a liquid crystal display device including a pair of substrates, a liquid crystal layer held between the substrates, and the liquid crystal alignment film disposed between at least one of the substrates and the liquid crystal layer.

7 Claims, No Drawings

LIQUID CRYSTAL ALIGNMENT AGENT, LIQUID CRYSTAL ALIGNMENT FILM, AND LIQUID CRYSTAL DISPLAY DEVICE

CROSS-REFERENCE TO RELATED APPLICATIONS

The present application claims priority under 35 U.S.C. § 119 to Japanese Patent Application No. 2018-013986 filed on Jan. 30, 2018, the contents of which are incorporated herein by reference in their entirety.

BACKGROUND OF THE INVENTION

Field of the Invention

The present invention relates to liquid crystal alignment agents, liquid crystal alignment films, and liquid crystal display devices.

Description of Related Art

Typical liquid crystal display devices include a liquid crystal alignment film configured to control the alignment of liquid crystal molecules. A liquid crystal alignment film subjected to an alignment treatment such as rubbing or photoalignment, for example, exerts its alignment controlling force on liquid crystal molecules. Rubbing a liquid crystal alignment film, however, generates dust from the rubbing cloth, which causes an undesired decrease in the display quality, for example. Rubbing has therefore been replaced by photoalignment, which includes application of light such as ultraviolet rays to form a liquid crystal alignment film (photoalignment film) (e.g., JP 6056187 B, JP 3893659 B, and WO 2010/092989).

BRIEF SUMMARY OF THE INVENTION

When a liquid crystal alignment agent containing a polymer of a tetracarboxylic dianhydride having a cyclobutane skeleton and a diamine is used to form a liquid crystal alignment film, photoalignment treatment by polarized light application selectively decomposes a polymer main chain substantially parallel to the polarization direction, generating maleimide compounds as decomposition products. When having many such maleimide compounds generated as decomposition products on a surface, however, the liquid crystal alignment film cannot exhibit its liquid crystal alignment performance (cannot align liquid crystal molecules). Liquid crystal alignment films have therefore been baked after photoalignment, so that the maleimide compounds sublime and the liquid crystal alignment film can exhibit its liquid crystal alignment performance.

The sublimed maleimide compounds, however, may accumulate in the furnace used for baking. The accumulated compounds may adhere to the surfaces of liquid crystal alignment films or damage the surfaces of liquid crystal alignment films. For example, the sublimed maleimide compounds may accumulate to form icicles on the door of the furnace, and the accumulated compounds may adhere to the surfaces of liquid crystal alignment films or damage the surfaces of liquid crystal alignment films. This may result in poor alignment of liquid crystal molecules (causing defects such as bright spots, foreign substances, film scratches).

In response to the above issues, an object of the present invention is to provide a liquid crystal alignment film capable of exhibiting its liquid crystal alignment performance without sublimation of decomposition products, a liquid crystal alignment agent used to form the liquid crystal alignment film, and a liquid crystal display device including the liquid crystal alignment film.

The present inventor made various studies on how to enable a liquid crystal alignment film to exhibit its liquid crystal alignment performance without sublimation of decomposition products. The studies found that a liquid crystal alignment agent containing a polymer of a predetermined tetracarboxylic dianhydride and a diamine having a predetermined structure similar to a liquid crystal molecule (liquid crystal compound) enables a liquid crystal alignment film to exhibit its liquid crystal alignment performance without sublimation of decomposition products. The inventor thereby successfully achieved the above object, completing the present invention.

In other words, an aspect of the present invention may be a liquid crystal alignment agent containing: a polyamic acid which is a polymer of a tetracarboxylic dianhydride represented by the following formula (1) and any one of diamines represented by the following formulas (2) to (7), or a derivative of the polyamic acid.

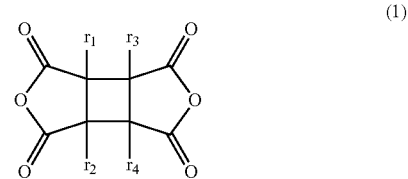
(1)

In the formula (1), $r_1$, $r_2$, $r_3$, and $r_4$ each independently represent a hydrogen atom or a C1-C4 alkyl,

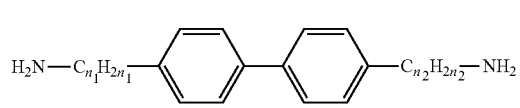
(2)

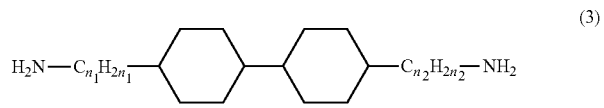
(3)

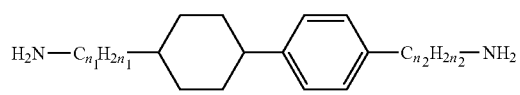
(4)

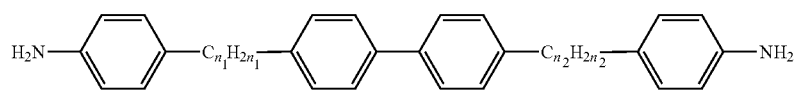
(5)

-continued

(6)

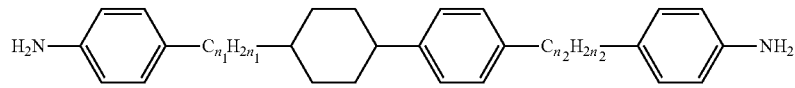

(7)

In the formulas (2) to (7), $n_1$ and $n_2$ are each independently 2 or 3.

Another aspect of the present invention may be a liquid crystal alignment film containing: a polyimide compound represented by the following formula (8), which is an imidization product of the polymer in the liquid crystal alignment agent.

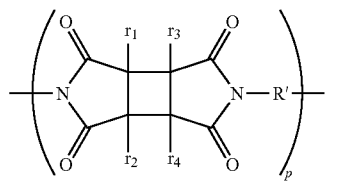

(8)

In the formula (8), $r_1$, $r_2$, $r_3$, and $r_4$ are each independently a hydrogen atom or a C1-C4 alkyl, p represents the number of repetitions and is an integer of 1 or greater, and R' is any one of structures represented by the following formulas (9) to (14).

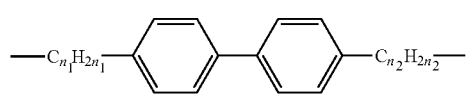

(9)

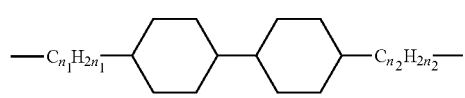

(10)

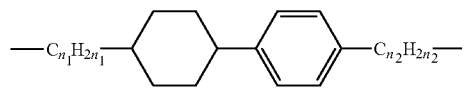

(11)

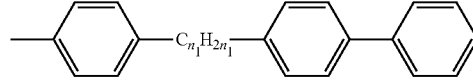

(12)

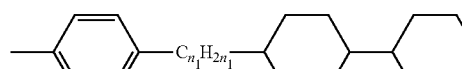

(13)

(14)

In the formulas (9) to (14), $n_1$ and $n_2$ are each independently 2 or 3.

Yet another aspect of the present invention may be a liquid crystal display device including: a pair of substrates; a liquid crystal layer held between the substrates; and the liquid crystal alignment film disposed between at least one of the substrates and the liquid crystal layer.

The present invention can provide a liquid crystal alignment film capable of exhibiting its liquid crystal alignment performance without sublimation of decomposition products, a liquid crystal alignment agent used to form the liquid crystal alignment film, and a liquid crystal display device including the liquid crystal alignment film.

DETAILED DESCRIPTION OF THE INVENTION

The present invention is described in more detail below based on an embodiment. The embodiment, however, is not intended to limit the scope of the present invention. The configurations of the embodiment may appropriately be combined or modified within the spirit of the present invention.

The expression "X to Y" as used herein means "X or more and Y or less".

EMBODIMENT

A liquid crystal alignment agent, a liquid crystal alignment film, and a liquid crystal display device of an embodiment are described below using an exemplary method for producing a liquid crystal display device.

<Preparation of Liquid Crystal Alignment Agent>

A liquid crystal alignment agent is prepared. The liquid crystal alignment agent contains a polyamic acid or a derivative thereof. The polyamic acid is a polymer of a tetracarboxylic dianhydride represented by the following formula (1) and any one of diamines represented by the following formulas (2) to (7).

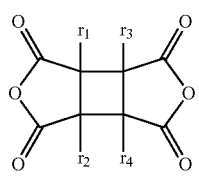
(1)

In the formula (1), $r_1$, $r_2$, $r_3$, and $r_4$ each independently represent a hydrogen atom or a C1-C4 alkyl.

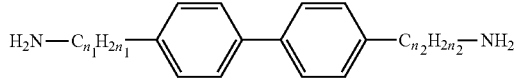
(2)

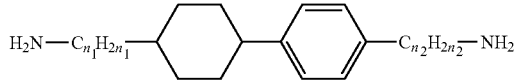
(4)

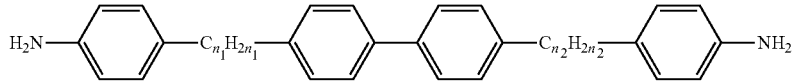
(5)

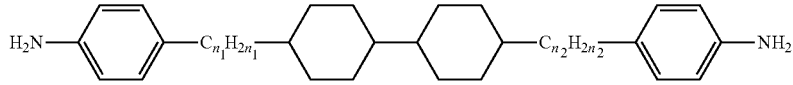
(6)

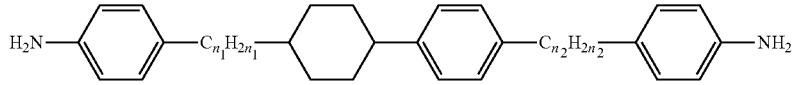
(7)

In the formulas (2) to (7), $n_1$ and $n_2$ are each independently 2 or 3.

The polymer of a tetracarboxylic dianhydride represented by the formula (1) and any one of diamines represented by the formulas (2) to (7) is a polyamic acid represented by the following formula (15).

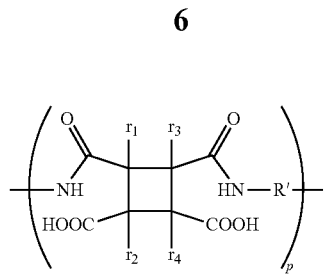
(15)

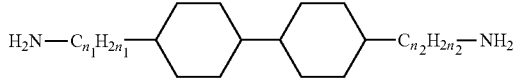
(3)

In the formula (15), $r_1$, $r_2$, $r_3$, and $r_4$ are the same as $r_1$, $r_2$, $r_3$, and $r_4$ in the formula (1), respectively, p represents the number of repetitions and is an integer of 1 or greater, and R' is any one of structures represented by the following formulas (9) to (14).

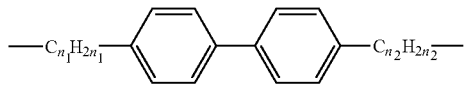
(9)

(10)

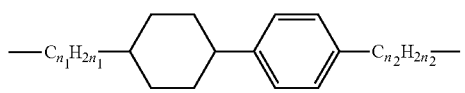
(11)

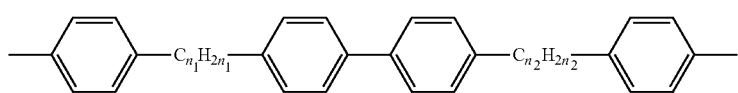
(12)

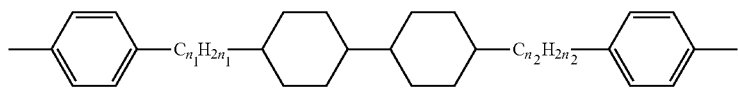
(13)

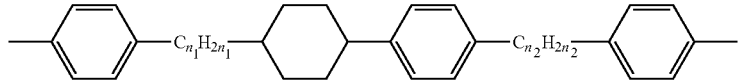
(14)

In the formulas (9) to (14), $n_1$ and $n_2$ are the same as $n_1$ and $n_2$ in the formulas (2) to (7), respectively.

In the liquid crystal alignment agent, the polyamic acid represented by the formula (15) or a derivative thereof has a cyclobutane ring and is what is called a photolytic component. In preparation of the liquid crystal alignment agent (polyamic acid or a derivative thereof), the mole ratio of the tetracarboxylic dianhydride represented by the formula (1) and any one of diamines represented by the formulas (2) to (7) is preferably 0.9 to 1.1.

The presence of the polyamic acid represented by the formula (15) or a derivative thereof in the liquid crystal alignment agent can be confirmed by analyzing, by nuclear magnetic resonance (NMR) spectroscopy, a solids content obtained from precipitation in a large amount of an alcohol or a poor solvent, for example.

The liquid crystal alignment agent containing a photolytic component, which is the polyamic acid represented by the formula (15) or a derivative thereof, may further contain as at least one additional component another photolytic component or a non-photolytic component. For example, the liquid crystal alignment agent may contain a photolytic component, which is the polyamic acid represented by the formula (15) or a derivative thereof, and less than 1 mol % of another photolytic component. The liquid crystal alignment agent may contain one or two or more such additional components.

The liquid crystal alignment agent may further contain a solvent. Examples of the solvent include polar aprotic organic solvents such as N-methyl-2-pyrrolidone, butyl cellosolve, and γ-butyrolactone. These polar aprotic organic solvents function as good solvents for the polyamic acid represented by the formula (15) or a derivative thereof.

The concentration of the polyamic acid represented by the formula (15) or a derivative thereof in the liquid crystal alignment agent is preferably 4.5 to 6 wt %. If the concentration is lower than 4.5 wt %, the applicability of the liquid crystal alignment agent may decrease (for example, a significant application pattern collapse may occur). If the concentration is higher than 6 wt %, the polyamic acid or a derivative thereof may separate from the liquid crystal alignment agent.

<Application of Liquid Crystal Alignment Agent>

The liquid crystal alignment agent is applied to a surface of at least one of the substrates, so that a film of the liquid crystal alignment agent is formed.

The liquid crystal alignment agent may be applied by a method such as flexo printing or ink jetting, for example. The pair of substrates may be washed in advance with water, for example.

Examples of the combination of the pair of substrates include a thin-film transistor array substrate and a color filter substrate usually used in the field of liquid crystal display devices.

<Pre-Baking>

The film of the liquid crystal alignment agent is pre-baked (dried). This volatilize (dries) a solvent in the case where the liquid crystal alignment agent contains the solvent. The solvent may be partially or fully removed by the pre-baking. The pre-baking may be performed by heating at 60° C. to 90° C., for example.

<Post-Baking>

The film of the liquid crystal alignment agent is post-baked. This allows imidization of the polyamic acid represented by the formula (15) or a derivative thereof to proceed, generating a polyimide compound represented by the following formula (8). The post-baking may be performed by heating at 180° C. to 230° C. for 15 to 40 minutes, for example.

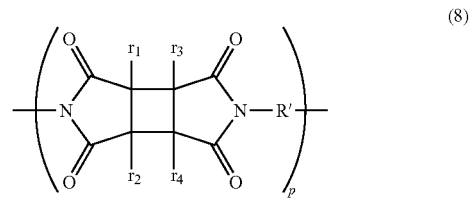

In the formula (8), $r_1$, $r_2$, $r_3$, $r_4$, p, and R' are the same as $r_1$, $r_2$, $r_3$, $r_4$, p, and R' in the formula (15), respectively.

<Photoalignment>

The film of the liquid crystal alignment agent is irradiated with polarized light for photoalignment. Thereby, a liquid crystal alignment film (photoalignment film) is formed. The polarized light application may be performed through a wire grid polarizer, for example.

The polarized light applied to the film of the liquid crystal alignment agent is preferably polarized ultraviolet rays. The polarized ultraviolet rays may have a wavelength of 200 to 400 nm. The wavelength can be adjusted as appropriate using a filter, for example. For example, in the case where the pair of substrates is a combination of a thin-film transistor array substrate and a color filter substrate, a cut-off filter configured to block polarized ultraviolet rays having a wavelength of 240 nm or shorter or a band-pass filter configured to transmit polarized ultraviolet rays having a wavelength of 254 nm is preferably used to avoid undesirable effects including deterioration of the thin-film transistor elements and color fading of color filter layers.

The photoalignment selectively decomposes the polymer main chain being substantially parallel to the polarization direction in the photoalignment (i.e., the cyclobutane ring selectively cleaves) as shown in the following formula (16) in the polyimide compound represented by the formula (8) in the film of the liquid crystal alignment agent, generating maleimide compounds as decomposition products.

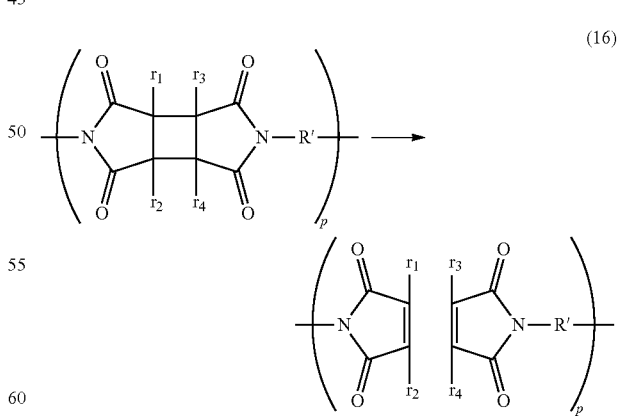

In the formula (16), $r_1$, $r_2$, $r_3$, $r_4$, p, and R' are the same as $r_1$, $r_2$, $r_3$, $r_4$, p, and R' in the formula (8), respectively.

In the formula (16), since the structure R' in the polyimide compound has a benzene ring and/or a cyclohexane ring, the benzene ring and/or the cyclohexane ring function(s) as light-absorbing site(s) in the photoalignment, accelerating the cleavage of the cyclobutane ring.

The above reactions make dominant the components perpendicular to the polarization direction in the photoalignment in the polymer main chain constituting the liquid crystal alignment film. In other words, the liquid crystal alignment film contains a polyimide component represented by the formula (8) as such a polymer main chain.

Immediately after the photoalignment, many maleimide compounds, which are decomposition products, are present on the surface of the liquid crystal alignment film. The liquid crystal alignment film therefore cannot exhibit its liquid crystal alignment performance. Thus, conventional methods include baking the alignment film after the photoalignment so as to sublime the maleimide compounds, enabling the liquid crystal alignment film to exhibit its liquid crystal alignment performance. The sublimed maleimide compounds, however, may accumulate in the furnace used for baking. The accumulated compounds may adhere to the surfaces of liquid crystal alignment films or damage the surfaces of liquid crystal alignment films. This may result in poor alignment of liquid crystal molecules (causing defects such as bright spots, foreign substances, film scratches).

In contrast, the maleimide compounds, which are decomposition compounds, in the present embodiment each have the structure R' (any one of the structures represented by the formulas (9) to (14)), which is similar to a liquid crystal molecule (liquid crystal compound) and derived from any one of the diamines represented by the formulas (2) to (7). Thus, heating after formation of the liquid crystal layer in a subsequent process enables the maleimide compounds to dissolve (spread) in the liquid crystal layer and behave like liquid crystal molecules. The present embodiment therefore enables the liquid crystal alignment film to exhibit its liquid crystal alignment performance without sublimation of the maleimide compounds. Since the liquid crystal alignment film in the present embodiment contains a polyimide compound represented by the formula (8) and the linearity of the molecular chain is high, high liquid crystal alignment performance is achieved.

The basic structure of a typical liquid crystal molecule consists of a rigid core and a flexible side chain extending from each side of the core. The core requires at least two rings. Elongated linear compounds are considered favorable as liquid crystal molecules.

A liquid crystal molecule whose core is not modified with a polar group such as F or CN is known as a neutral liquid crystal component. A neutral liquid crystal component does not rotate by itself when voltage is applied to the liquid crystal layer (liquid crystal molecules), but rotates following the nearby positive liquid crystal material (liquid crystal material having positive anisotropy of dielectric constant) or negative liquid crystal material (liquid crystal material having negative anisotropy of dielectric constant).

Known examples of the positive liquid crystal material include a liquid crystal material represented by the following formula (17) whose core is terminally modified with polar groups F.

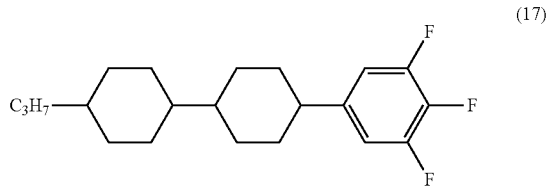

(17)

Known examples of the negative liquid crystal material include a liquid crystal material represented by the following formula (18) whose core is terminally modified with polar groups F at sites altering the linearity.

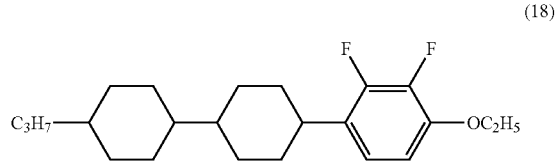

(18)

In view of the above points, the diamine (any one of the structures represented by the formulas (2) to (7)) constituting the polymer in the liquid crystal alignment agent in the present embodiment has a structure R' represented by any one of the formulas (9) to (14) and similar to a neutral liquid crystal component. Specifically, the structure R' has a benzene ring and/or a cyclohexane ring in its core and a hydrocarbon group in a side chain extending from each side of the core. This structure gives the structure R' similar to a neutral liquid crystal component to the maleimide compounds generated as decomposition products in the photoalignment. Such maleimide compounds dissolved in the liquid crystal layer can function efficiently like liquid crystal molecules, regardless of whether the material of the liquid crystal layer is a positive liquid crystal material or a negative liquid crystal material.

The structure R' (any one of the structures represented by the formulas (9) to (14)) in each maleimide compound in the present embodiment contains two rings constituting the core which are selected from benzene rings and cyclohexane rings. Thus, the maleimide compound is not highly anisotropic and tends to have a structure similar to the material of the liquid crystal layer. Also, since the side chain extending from each side of the core has a linear shape and is sufficiently long, the maleimide compound has flexibility similar to a liquid crystal molecule. In order to increase the solubility of the maleimide compound in the liquid crystal layer, the numbers of carbon atoms in the side chains of the structure R' are preferably the same as each other, i.e., $n_1$ and $n_2$ in each of the formulas (9) to (14) are preferably the same as each other.

<Formation of Liquid Crystal Layer>

The substrates, at least one of which includes the liquid crystal alignment film on its surface, are bonded to each other with a sealant such that a liquid crystal layer is held between the substrates.

The liquid crystal layer can be formed by sealing a liquid crystal material between the substrates by a method such as drop filling or injection filling. The liquid crystal material may be a positive liquid crystal material or a negative liquid crystal material.

(Drop Filling)

Formation of a liquid crystal layer by drop filling includes the following processes, for example. A sealant is applied to a surface of one of the pair of substrates, while a liquid crystal material is dropped on a surface of the other substrate. The substrates are bonded to each other with the sealant, so that a liquid crystal layer is formed in a region surrounded by the sealant in a plan view.

The sealant is ultraviolet-cured by application of ultraviolet rays, and then heat-cured by heating. This prevents the liquid crystal material from leaking outside through the sealant, increasing the adhesion strength of the sealant.

The ultraviolet curing of the sealant may include, for example, irradiating the sealant with unpolarized ultraviolet rays having a wavelength of 365 nm with an irradiation dose of 5 to 20 J/cm$^2$. A light-shielding mask may be disposed on the liquid crystal alignment film as appropriate in ultraviolet curing of the sealant.

The heat-curing of the sealant may include, for example, heating the sealant at 120° C. to 150° C. for 40 to 60 minutes.

(Injection Filling)

Formation of a liquid crystal layer by injection filling includes the following processes, for example. A sealant is applied to a surface of one of the pair of substrates, and the substrates are bonded to each other with the sealant, followed by curing of the sealant. The sealant is cured by, for example, a combination method of the ultraviolet curing and the heat curing described above.

Between the substrates put into a vacuum state is injected a liquid crystal material, so that a liquid crystal layer is formed in a region surrounded by the sealant in a plan view.

<Re-Alignment>

The liquid crystal layer (liquid crystal material) is heated at a temperature not lower than the nematic-isotropic phase transition temperature, for re-alignment. The re-alignment for the liquid crystal layer may include, for example, heating at 110° C. to 150° C.

The re-alignment for the liquid crystal layer uniformly aligns liquid crystal molecules in the liquid crystal layer. Also, in the present embodiment, the re-alignment, under the influence of the decrease in viscosity involved in the phase transition (from the nematic phase to the isotropic phase) of the liquid crystal layer, causes maleimide compounds generated in the photoalignment to spread from the surface of the liquid crystal alignment film into the liquid crystal layer and dissolve in the liquid crystal layer. The re-alignment therefore enables a liquid crystal alignment film to exhibit its liquid crystal alignment performance without sublimation of maleimide compounds.

An amount of 0.1 to 0.5 vol % of the maleimide compounds may be dissolved in 100 vol % of the liquid crystal layer. Even with such a small amount of the maleimide compounds dissolved, the liquid crystal alignment film can exhibit its liquid crystal alignment performance sufficiently. The liquid crystal alignment film contains a polyimide compound represented by the formula (8) as a polymer main chain as described above. The liquid crystal alignment film may further contain maleimide compounds (i.e., maleimide compounds may remain in the liquid crystal alignment film) or may contain no maleimide compound.

The presence of the maleimide compounds dissolved in the liquid crystal layer can be confirmed by, for example, dissolving the whole liquid crystal layer (including the liquid crystal material and the maleimide compounds) in a dichloroethane or acetone, for example, and analyzing the solution by gas chromatography-mass spectrometry (GC-MS) or high speed liquid chromatography (HPLC). The presence of the maleimide compounds remaining on the surface of the liquid crystal alignment film can be confirmed by, for example, washing the liquid crystal alignment film with hexane, obtaining an extract from the surface of the liquid crystal alignment film with acetonitrile, and analyzing the extract by liquid chromatography-mass chromatography (LC-MS).

The present embodiment utilizes the re-alignment for the liquid crystal layer as a method to dissolve maleimide compounds in the liquid crystal layer. Yet, the maleimide compounds may be dissolved by utilizing heat curing of the sealant in the case of forming the liquid crystal layer by drop filling. Specifically, since the liquid crystal layer is heated simultaneously when the sealant is heat-cured, the maleimide compound dissolves in the liquid crystal layer as long as the heat-curing temperature for the sealant is not lower than the nematic-isotropic phase transition temperature of the liquid crystal layer. This enables formation of a liquid crystal alignment film exhibiting its liquid crystal alignment performance in the formation of a liquid crystal layer, leading to a high production efficiency. Also, for example, with a low-temperature process including post-baking (imidizing) the film of the liquid crystal alignment agent at 180° C. and heat-curing the sealant at 130° C., at least one of the pair of substrates used may be a substrate having a low heat resistance and including a color filter layer with a high color purity or a plastic substrate (flexible substrate) having low heat resistance.

The maleimide compounds may be dissolved in the liquid crystal layer and removed from the surface of the liquid crystal alignment film as in the present embodiment. Yet, since having the structure R' similar to a liquid crystal molecule (neutral liquid crystal component), the maleimide compounds can also be easily removed from the surface of the liquid crystal alignment film by washing with an alcohol (e.g., isopropyl alcohol). Specifically, the liquid crystal alignment film after the photoalignment is washed with an alcohol to remove the maleimide compounds and the residual alcohol is removed by washing with water. Then, the liquid crystal layer is formed as described above, whereby a state with no maleimide compound dissolved in the liquid crystal layer can be achieved.

The above processes form the liquid crystal display device including the pair of substrates, the liquid crystal layer held between the substrates, and the liquid crystal alignment film disposed between at least one of the substrates and the liquid crystal layer and exhibiting its liquid crystal alignment performance without sublimation of maleimide compounds (decomposition products). The liquid crystal display device may appropriately include members such as a polarizer and a backlight.

The liquid crystal display device has excellent viewing angle characteristics, and therefore may be in a display mode of the in-plane switching (IPS) mode or the fringe field switching (FFS) mode, i.e., a horizontal alignment mode. In the liquid crystal display device in a display mode of a horizontal alignment mode, the liquid crystal alignment film functions to align nearby liquid crystal molecules in the direction parallel to its surfaces. The aligning the liquid crystal molecules in the direction parallel to the surfaces of the liquid crystal alignment film means that the pre-tilt angle of the liquid crystal molecules is 0° to 0.5°, preferably 0°, relative to the surfaces of the liquid crystal alignment film. The pre-tilt angle of the liquid crystal molecules means an angle of the major axis of each liquid crystal molecule relative to the surfaces of the liquid crystal alignment film when the voltage applied to the liquid crystal layer is lower than the threshold voltage (including no voltage application).

EXAMPLES AND COMPARATIVE EXAMPLES

The present invention is described in more detail below based on examples and comparative examples. The examples, however, are not intended to limit the scope of the present invention.

Example 1

A liquid crystal display device of Example 1 was produced by the following processes.

<Preparation of Liquid Crystal Alignment Agent>

A polyamic acid G1 represented by the following formula (G-1) was formed by reacting a tetracarboxylic dianhydride T1 represented by the following formula (T) and a diamine D1 represented by the following formula (D-1). The polyamic acid G1 (solids content) was then diluted with N-methyl-2-pyrrolidone serving as a solvent, so that a liquid crystal alignment agent A1 was prepared. The liquid crystal alignment agent A1 had a solids content concentration of 5.5 wt %.

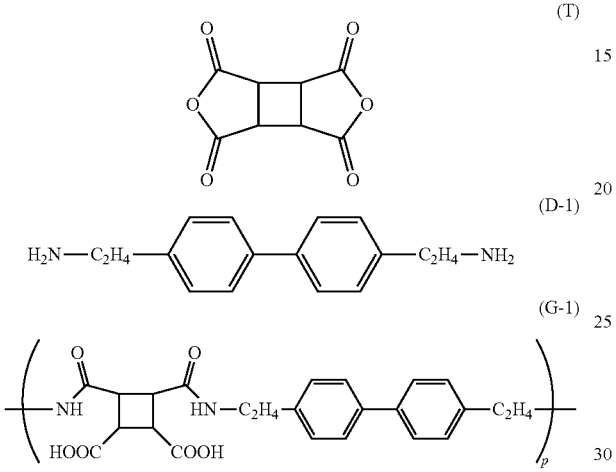

<Application of Liquid Crystal Alignment Agent>

The liquid crystal alignment agent A1 was applied to the surfaces of a thin-film transistor array substrate and a color filter substrate for the IPS mode by flexo printing. Thereby, a film of the liquid crystal alignment agent A1 was formed.

<Pre-Baking>

The film of the liquid crystal alignment agent A1 was pre-baked at 80° C. for two minutes.

<Post-Baking>

The film of the liquid crystal alignment agent A1 was post-baked at 230° C. for 30 minutes. Thereby, the imidization of the polyamic acid G1 in the liquid crystal alignment agent A1 proceeded, so that a polyimide compound J1 represented by the following formula (J-1) was generated.

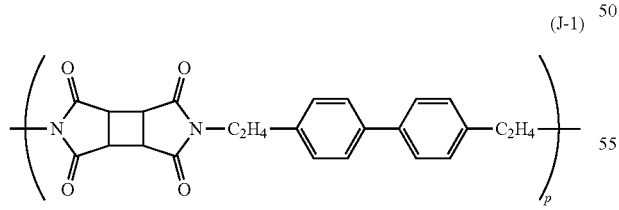

<Photoalignment>

The photoalignment was performed which irradiates the film of the liquid crystal alignment agent A1 with polarized ultraviolet rays (wavelength: 254 nm, irradiation dose: 1 J/cm$^2$), and thereby a liquid crystal alignment film was formed. This involved generation of decomposition products, i.e., maleimide compounds M1 represented by the following formula (M-1).

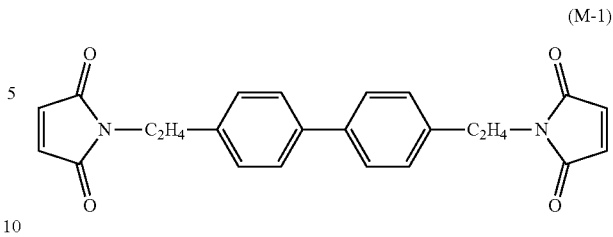

<Formation of Liquid Crystal Layer>

A sealant was applied to a surface of the color filter substrate, which is one of the two substrates each having the liquid crystal alignment film formed thereon, and a liquid crystal material was dropped on a surface of the thin-film transistor array substrate, which is the other substrate. The liquid crystal material used was a positive liquid crystal material represented by the following formula (17). The two substrates were bonded to each other with the sealant, whereby a liquid crystal layer was formed in a region surrounded by the sealant in a plan view.

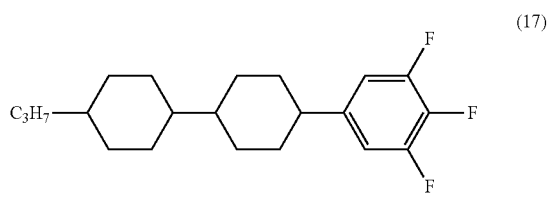

The sealant was irradiated with unpolarized ultraviolet rays (wavelength: 365 nm, irradiation dose: 12 J/cm$^2$), and then heated at 130° C. for 40 minutes to cure the sealant. Thereby, a liquid crystal display device of Example 1 was completed.

Example 2

A liquid crystal display device of Example 2 was produced as in Example 1, except that the liquid crystal alignment agent used was changed.

The liquid crystal alignment agent used was a liquid crystal alignment agent A2 prepared as follows. A polyamic acid G2 represented by the following formula (G-2) was formed by reacting the tetracarboxylic dianhydride T1 represented by the following formula (T) and a diamine D2 represented by the following formula (D-2). The polyamic acid G2 (solids content) was then diluted with N-methyl-2-pyrrolidone serving as a solvent, so that a liquid crystal alignment agent A2 was prepared. The liquid crystal alignment agent A2 had a solids content concentration of 5.4 wt %.

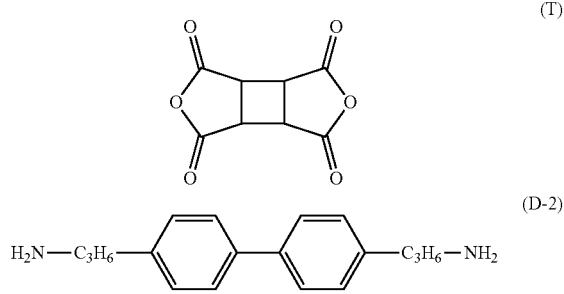

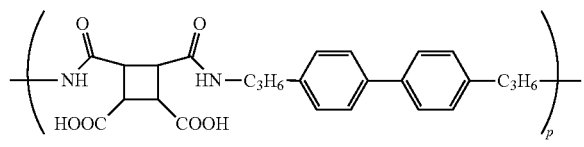
(G-2)

Post-baking of the film of the liquid crystal alignment agent A2 generated a polyimide compound J2 represented by the following formula (J-2).

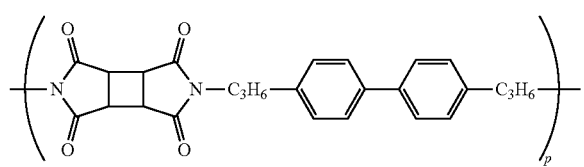
(J-2)

Photoalignment for the film of the liquid crystal alignment agent A2 generated maleimide compounds M2 represented by the following formula (M-2) as the decomposition products.

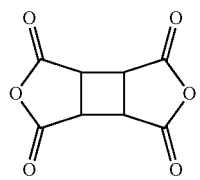
(T)

(M-2)

Example 3

A liquid crystal display device of Example 3 was produced as in Example 1, except that the liquid crystal alignment agent used was changed.

The liquid crystal alignment agent used was a liquid crystal alignment agent A3 prepared as follows. A polyamic acid G3 represented by the following formula (G-3) was formed by reacting the tetracarboxylic dianhydride T1 represented by the following formula (T) and a diamine D3 represented by the following formula (D-3). The polyamic acid G3 (solids content) was then diluted with N-methyl-2-pyrrolidone serving as a solvent, so that a liquid crystal alignment agent A3 was prepared. The liquid crystal alignment agent A3 had a solids content concentration of 5.6 wt %.

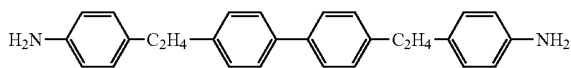
(D-3)

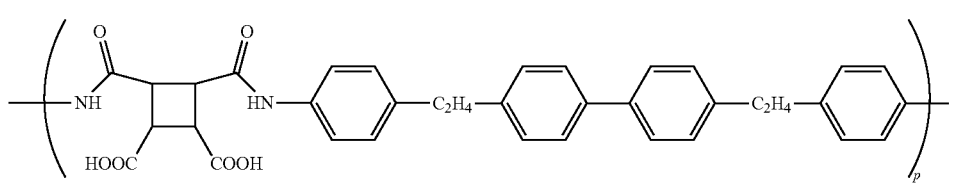
(G-3)

Post-baking of the film of the liquid crystal alignment agent A3 generated a polyimide compound J3 represented by the following formula (J-3).

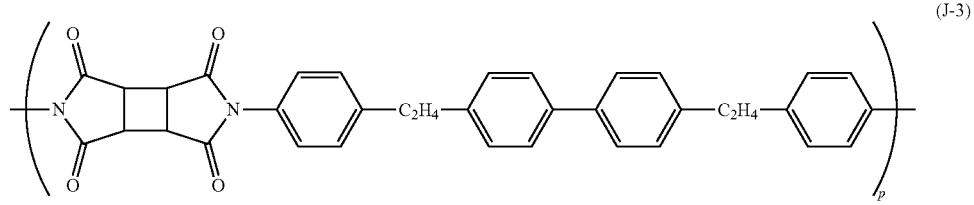
(J-3)

Photoalignment for the film of the liquid crystal alignment agent A3 generated maleimide compounds M3 represented by the following formula (M-3) as the decomposition products.

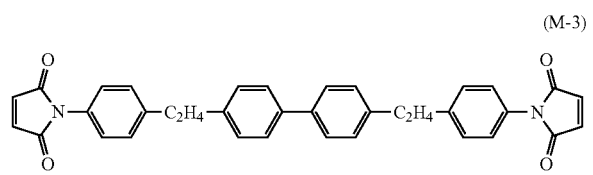

(M-3)

Example 4

A liquid crystal display device of Example 4 was produced as in Example 1, except that the liquid crystal alignment agent used was changed.

The liquid crystal alignment agent used was a liquid crystal alignment agent A4 prepared as follows. A polyamic acid G4 represented by the following formula (G-4) was formed by reacting the tetracarboxylic dianhydride T1 represented by the following formula (T) and a diamine D4 represented by the following formula (D-4). The polyamic acid G4 (solids content) was then diluted with N-methyl-2-pyrrolidone serving as a solvent, so that a liquid crystal alignment agent A4 was prepared. The liquid crystal alignment agent A4 had a solids content concentration of 5.5 wt %.

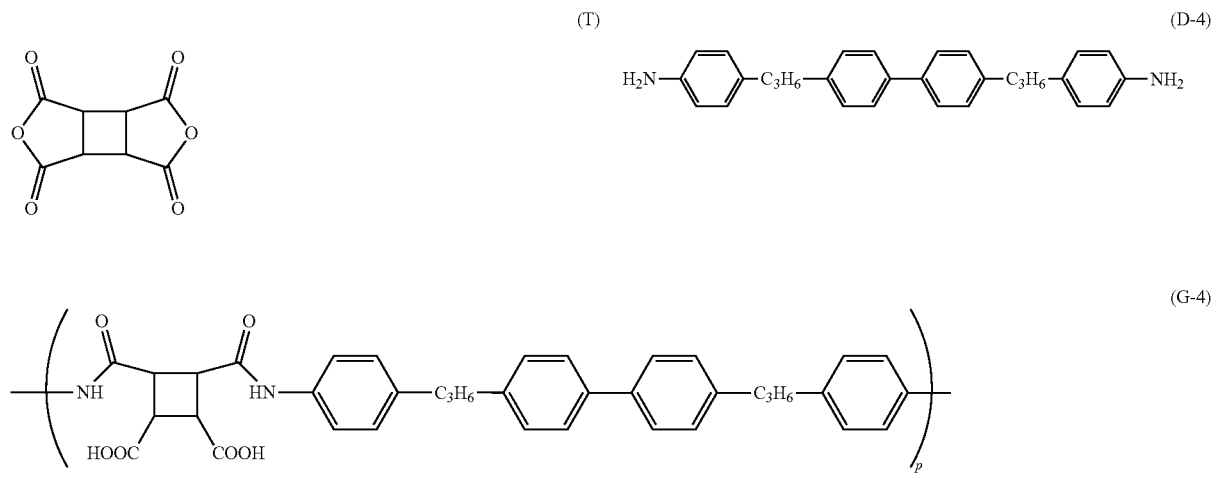

Post-baking of the film of the liquid crystal alignment agent A4 generated a polyimide compound J4 represented by the following formula (J-4).

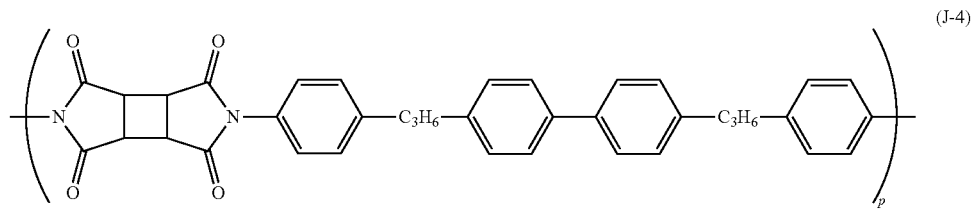

(J-4)

Photoalignment for the film of the liquid crystal alignment agent A4 generated maleimide compounds M4 represented by the following formula (M-4) as the decomposition products.

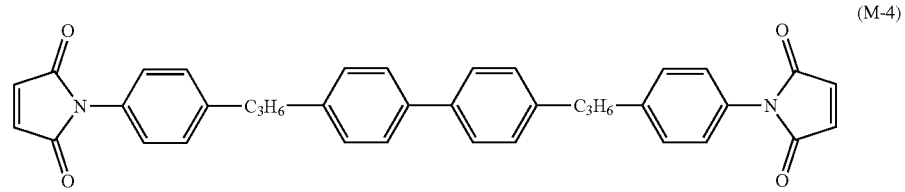

(M-4)

Comparative Example 1

A liquid crystal display device of Comparative Example 1 was produced as in Example 1, except that the liquid crystal alignment agent used was changed.

The liquid crystal alignment agent used was a liquid crystal alignment agent B1 prepared as follows. A polyamic acid H1 represented by the following formula (H-1) was formed by reacting the tetracarboxylic dianhydride T1 represented by the following formula (T) and a diamine E1 represented by the following formula (E-1). The polyamic acid H1 (solids content) was then diluted with N-methyl-2-pyrrolidone serving as a solvent, so that a liquid crystal alignment agent B1 was prepared. The liquid crystal alignment agent B1 had a solids content concentration of 5.5 wt %.

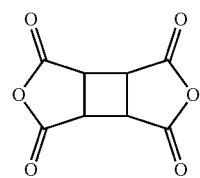
(T)

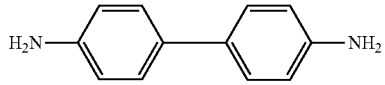
(E-1)

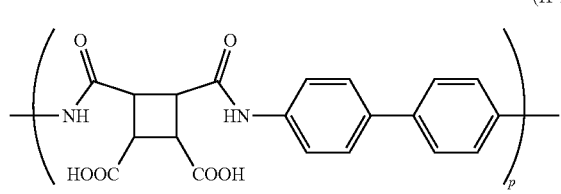
(H-1)

Post-baking of the film of the liquid crystal alignment agent B1 generated a polyimide compound K1 represented by the following formula (K-1).

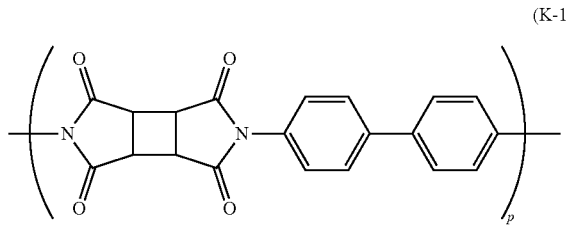
(K-1)

Photoalignment for the film of the liquid crystal alignment agent B1 generated maleimide compounds N1 represented by the following formula (N-1) as the decomposition products.

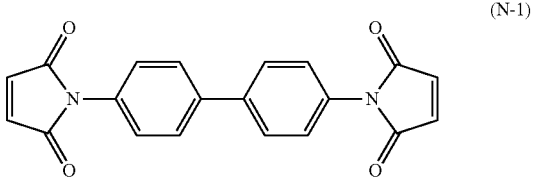 [SMILES: O=C1C=CC(=O)N1c1ccc(-c2ccc(N3C(=O)C=CC3=O)cc2)cc1]
(N-1)

Comparative Example 2

A liquid crystal display device of Comparative Example 2 was produced as in Example 1, except that the liquid crystal alignment agent used was changed.

The liquid crystal alignment agent used was a liquid crystal alignment agent B2 prepared as follows. A polyamic acid H2 represented by the following formula (H-2) was formed by reacting the tetracarboxylic dianhydride T1 represented by the following formula (T) and a diamine E2 represented by the following formula (E-2). The polyamic acid H2 (solids content) was then diluted with N-methyl-2-pyrrolidone serving as a solvent, so that a liquid crystal alignment agent B2 was prepared. The liquid crystal alignment agent B2 had a solids content concentration of 5.6 wt %.

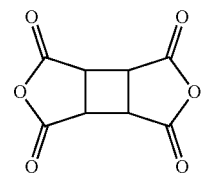
(T)

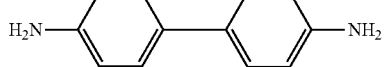
(E-2)

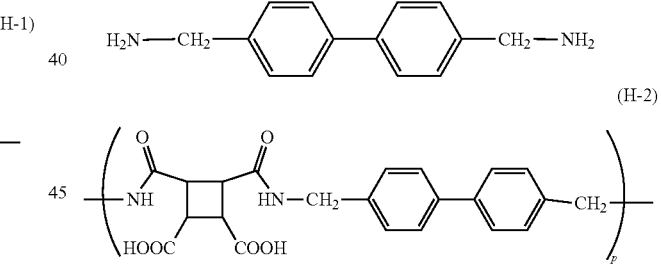
(H-2)

Post-baking of the film of the liquid crystal alignment agent B2 generated a polyimide compound K2 represented by the following formula (K-2).

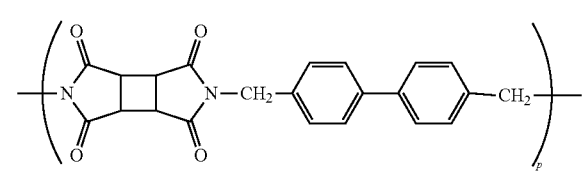
(K-2)

Photoalignment for the film of the liquid crystal alignment agent B2 generated maleimide compounds N2 represented by the following formula (N-2) as the decomposition products.

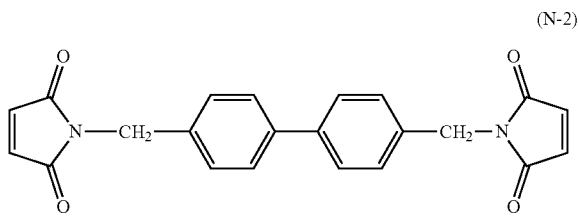 [SMILES: O=C1C=CC(=O)N1Cc1ccc(-c2ccc(CN3C(=O)C=CC3=O)cc2)cc1]

(N-2)

Comparative Example 3

A liquid crystal display device of Comparative Example 3 was produced as in Example 1, except that the liquid crystal alignment agent used was changed.

The liquid crystal alignment agent used was a liquid crystal alignment agent B3 prepared as follows. A polyamic acid H3 represented by the following formula (H-3) was formed by reacting the tetracarboxylic dianhydride T1 represented by the following formula (T) and a diamine E3 represented by the following formula (E-3). The polyamic acid H3 (solids content) was then diluted with N-methyl-2-pyrrolidone serving as a solvent, so that a liquid crystal alignment agent B3 was prepared. The liquid crystal alignment agent B3 had a solids content concentration of 5.4 wt %.

Post-baking of the film of the liquid crystal alignment agent B3 generated a polyimide compound K3 represented by the following formula (K-3).

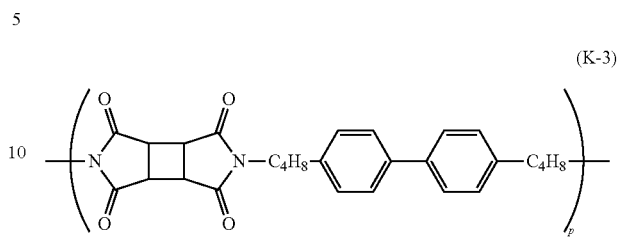

(K-3)

Photoalignment for the film of the liquid crystal alignment agent B3 generated maleimide compounds N3 represented by the following formula (N-3) as the decomposition products.

(N-3)

Comparative Example 4

A liquid crystal display device of Comparative Example 4 was produced as in Example 1, except that the liquid crystal alignment agent used was changed.

The liquid crystal alignment agent used was a liquid crystal alignment agent B4 prepared as follows. A polyamic acid H4 represented by the following formula (H-4) was formed by reacting the tetracarboxylic dianhydride T1 represented by the following formula (T) and a diamine E4 represented by the following formula (E-4). The polyamic acid H4 (solids content) was then diluted with N-methyl-2-pyrrolidone serving as a solvent, so that a liquid crystal alignment agent B4 was prepared. The liquid crystal alignment agent B4 had a solids content concentration of 5.6 wt %.

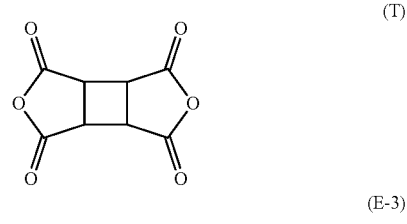

(T)

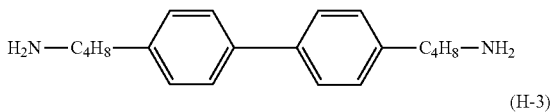

(E-3)

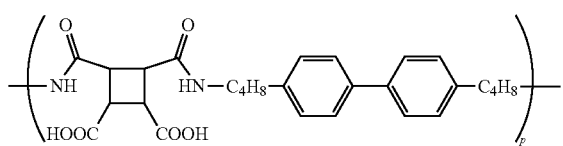

(H-3)

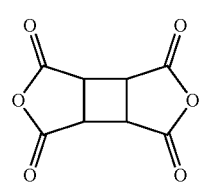

(T)

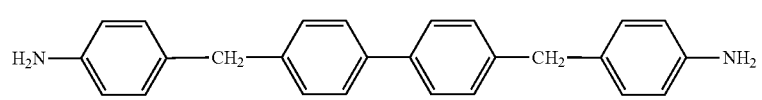

(E-4)

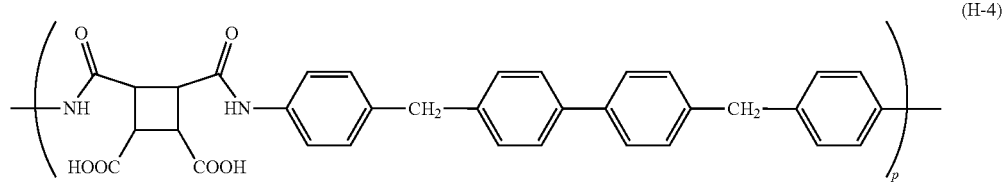

(H-4)

Post-baking of the film of the liquid crystal alignment agent B4 generated a polyimide compound K4 represented by the following formula (K-4).

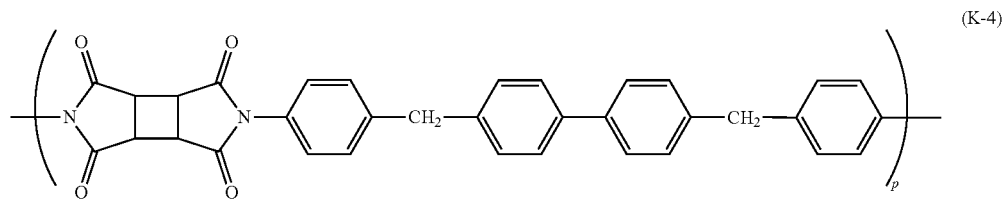

(K-4)

Photoalignment for the film of the liquid crystal alignment agent B4 generated maleimide compounds N4 represented by the following formula (N-4) as the decomposition products.

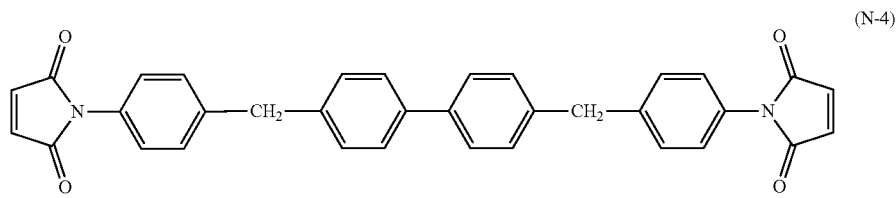 [SMILES: O=C1C=CC(=O)N1c1ccc(Cc2ccc(-c3ccc(Cc4ccc(N5C(=O)C=CC5=O)cc4)cc3)cc2)cc1]

(N-4)

Comparative Example 5

A liquid crystal display device of Comparative Example 5 was produced as in Example 1, except that the liquid crystal alignment agent used was changed.

The liquid crystal alignment agent used was a liquid crystal alignment agent B5 prepared as follows. A polyamic acid H5 represented by the following formula (H-5) was formed by reacting the tetracarboxylic dianhydride T1 represented by the following formula (T) and a diamine E5 represented by the following formula (E-5). The polyamic acid H5 (solids content) was then diluted with N-methyl-2-pyrrolidone serving as a solvent, so that a liquid crystal alignment agent B5 was prepared. The liquid crystal alignment agent B5 had a solids content concentration of 5.6 wt %.

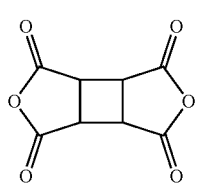

(T)

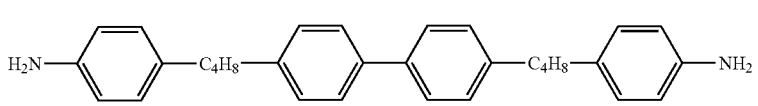

(E-5)

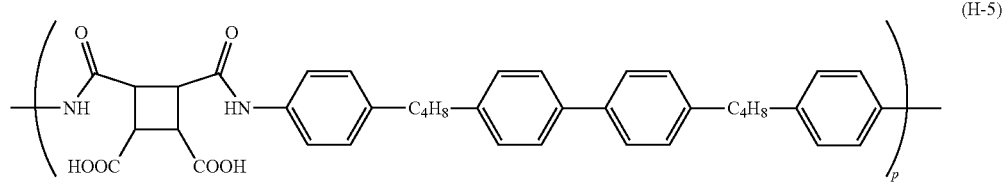

Post-baking of the film of the liquid crystal alignment agent B5 generated a polyimide compound K5 represented by the following formula (K-5).

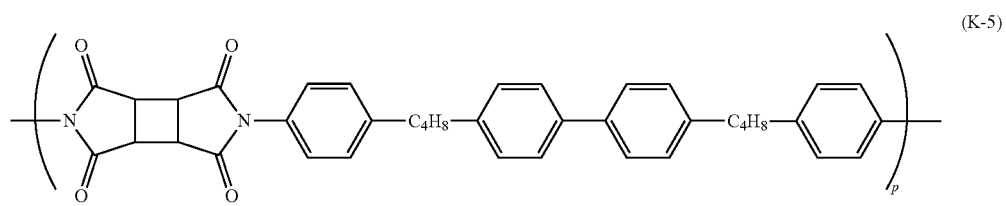

Photoalignment for the film of the liquid crystal alignment agent B5 generated maleimide compounds N5 represented by the following formula (N-5) as the decomposition products.

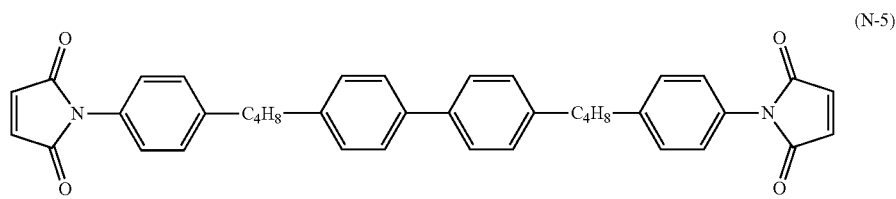

Comparative Example 6

A liquid crystal display device of Comparative Example 6 was produced as in Example 1, except that the liquid crystal alignment agent used was changed.

The liquid crystal alignment agent used was a liquid crystal alignment agent B6 prepared as follows. A polyamic acid H6 represented by the following formula (H-6) was formed by reacting the tetracarboxylic dianhydride T1 represented by the following formula (T) and a diamine E6 represented by the following formula (E-6). The polyamic acid H6 (solids content) was then diluted with N-methyl-2-pyrrolidone serving as a solvent, so that a liquid crystal alignment agent B6 was prepared. The liquid crystal alignment agent B6 had a solids content concentration of 5.4 wt %.

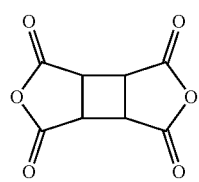

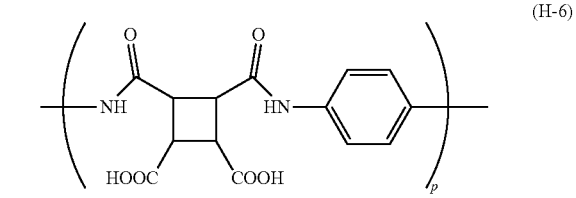

Post-baking of the film of the liquid crystal alignment agent B6 generated a polyimide compound K6 represented by the following formula (K-6).

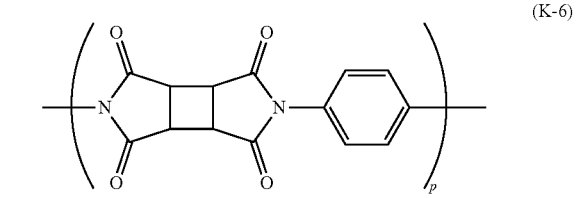

Photoalignment for the film of the liquid crystal alignment agent B6 generated maleimide compounds N6 represented by the following formula (N-6) as the decomposition products.

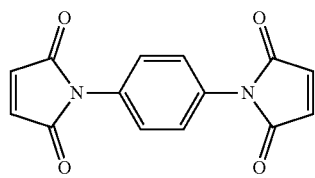

(N-6)

Comparative Example 7

A liquid crystal display device of Comparative Example 7 was produced as in Example 1, except that the liquid crystal alignment agent used was changed.

The liquid crystal alignment agent used was a liquid crystal alignment agent B7 prepared as follows. A polyamic acid H7 represented by the following formula (H-7) was formed by reacting the tetracarboxylic dianhydride T1 represented by the following formula (T) and a diamine E7 represented by the following formula (E-7). The polyamic acid H7 (solids content) was then diluted with N-methyl-2-pyrrolidone serving as a solvent, so that a liquid crystal alignment agent B7 was prepared. The liquid crystal alignment agent B7 had a solids content concentration of 5.5 wt %.

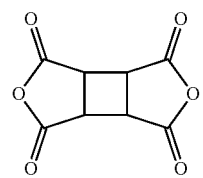

(T)

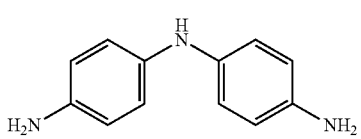

(E-7)

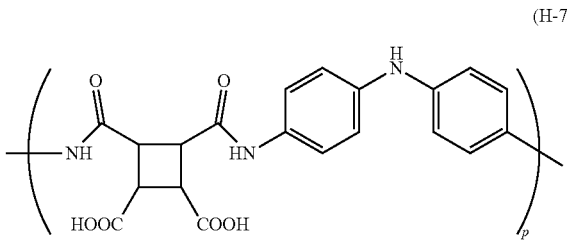

(H-7)

Post-baking of the film of the liquid crystal alignment agent B7 generated a polyimide compound K7 represented by the following formula (K-7).

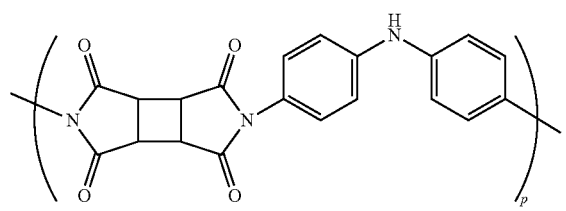

(K-7)

Photoalignment for the film of the liquid crystal alignment agent B7 generated maleimide compounds N7 represented by the following formula (N-7) as the decomposition products.

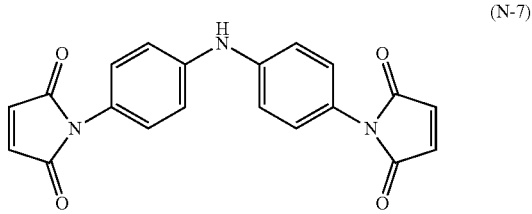 [SMILES: O=C1C=CC(=O)N1c1ccc(Nc2ccc(N3C(=O)C=CC3=O)cc2)cc1]

(N-7)

[Evaluation]

Liquid crystal display devices of Examples 1 to 4 and Comparative Examples 1 to 7 were subjected to the following evaluations. The results are shown in Table 1.

<Flow Alignment>

Each liquid crystal display device (in a no voltage application state) sandwiched between two linear polarizers disposed in crossed Nicols (normally black state) was visually observed to determine whether or not flow alignment occurred. Flow alignment is a phenomenon in which the alignment becomes uneven locally (e.g., in a shape resembling tree rings) as the dropped liquid crystal material spreads. Such flow alignment seems to appear in regions where the liquid crystal alignment performance of each liquid crystal alignment film is not uniform (locally poor) in the plane. In other words, observation of no flow alignment is considered to suggest that the liquid crystal alignment performance of each liquid crystal alignment film is uniform in the plane.

<Roughness>

Each liquid crystal display device (in a no voltage application state) sandwiched between two linear polarizers disposed in crossed Nicols (normally black state) was visually observed to determine whether or not the display had roughness. Roughness is a phenomenon in which because of micro-sized alignment disorders of liquid crystal molecules gathered together, the luminance in black display does not decrease and thus the contrast ratio does not increase. Such roughness seems to appear when the maleimide compounds generated in the photoalignment are not dispersed (dissolved) uniformly in the liquid crystal layer. In other words, observation of no roughness is considered to suggest that the maleimide compounds dissolved in the liquid crystal layer are uniformly dispersed.

TABLE 1

| | Flow alignment | Roughness |
|---|---|---|
| Example 1 | Not observed | Not observed |
| Example 2 | Not observed | Not observed |
| Example 3 | Not observed | Not observed |
| Example 4 | Not observed | Not observed |
| Comparative Example 1 | Not observed | Observed |
| Comparative Example 2 | Not observed | Observed |
| Comparative Example 3 | Observed | Not observed |
| Comparative Example 4 | Not observed | Observed |
| Comparative Example 5 | Observed | Not observed |
| Comparative Example 6 | Observed | Observed |
| Comparative Example 7 | Observed | Observed |

In Examples 1 to 4, flow alignment and roughness were not observed, and the alignability of the liquid crystal molecules was high. In other words, the results show that in Examples 1 to 4, the liquid crystal alignment performance of each liquid crystal alignment film was uniform in the plane and the maleimide compounds dissolved in the liquid crystal layer were uniformly dispersed.

In Comparative Examples 1, 2, and 4, the maleimide compounds N1, N2, and N4 generated in the photoalignment were apt to sublime (those having a structure derived from an easily subliming diamine E1, E2, or E4) and unlikely to dissolve in the liquid crystal layer in the heating (here, heat-curing of the sealant), so that roughness was observed.

In Comparative Examples 6 and 7, the maleimide compounds N6 and N7 generated in the photoalignment were very apt to sublime (those having a structure derived from a very easily subliming diamine E6 or E7) and did not dissolve in the liquid crystal layer in the heating (here, heat-curing of the sealant), so that flow alignment and roughness were observed.

In Comparative Examples 3 and 5, the alkyl chains (alkyl chains derived from the respective diamines E3 and E5) in the respective maleimide compounds N3 and N5 generated in the photoalignment were long. This varied the solubility of the maleimide compounds in the liquid crystal layer in the plane of each liquid crystal alignment film. The liquid crystal alignment performance of each liquid crystal alignment film was therefore not uniform in the plane, and flow alignment was observed.

The liquid crystal display devices evaluated as described above contained the positive liquid crystal material represented by the formula (17) as the liquid crystal material constituting the liquid crystal layer. Yet, evaluation on liquid crystal display devices containing a negative liquid crystal material represented by the following formula (18) showed the same results.

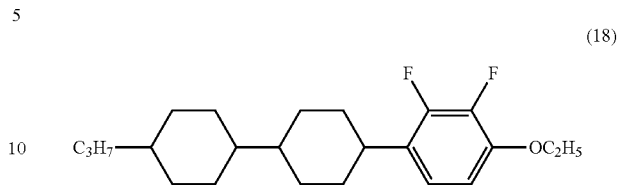

(18)

The liquid crystal display devices evaluated as Examples 1 to 4 above contained liquid crystal alignment agents A1 to A4 among the liquid crystal alignment agents containing a polyamic acid which is a polymer of a tetracarboxylic dianhydride represented by the formula (1) and any one of diamines represented by the formulas (2) to (7), or a derivative of the polyamic acid. Yet, liquid crystal display devices containing any other liquid crystal alignment agent among them will presumably give the same results.

Evaluations were also made on liquid crystal display devices containing the respective liquid crystal alignment agents A1 to A4 mixed with less than 1 mol % of the polyamic acid H6 or the polyamic acid H7, which is a different photolytic component (i.e., those obtained by mixing less than 1 mol % of the polyimide compound K6 or the polyimide compound K7 into the liquid crystal alignment films of each of the liquid crystal display devices of Examples 1 to 4). These liquid crystal display devices gave the same results as those of Examples 1 to 4.

[Additional Remarks]

One aspect of the present invention may be a liquid crystal alignment agent containing: a polyamic acid which is a polymer of a tetracarboxylic dianhydride represented by the following formula (1) and any one of diamines represented by the following formulas (2) to (7), or a derivative of the polyamic acid. This aspect achieves a liquid crystal alignment agent for forming a liquid crystal alignment film capable of exhibiting its liquid crystal alignment performance without sublimation of the decomposition products.

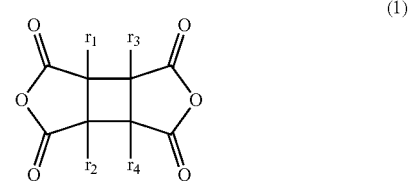

(1)

In the formula (1), $r_1$, $r_2$, $r_3$, and $r_4$ each independently represent a hydrogen atom or a C1-C4 alkyl.

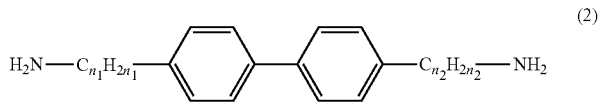

(2)

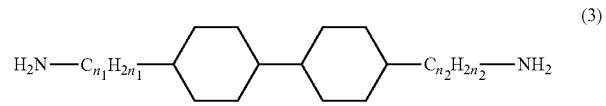

(3)

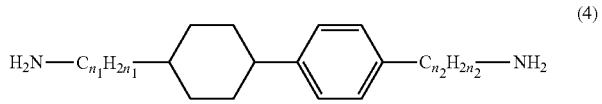

(4)

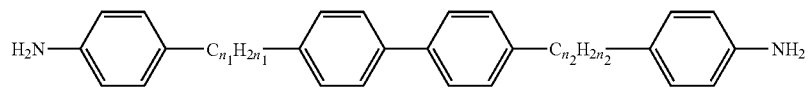
(5)

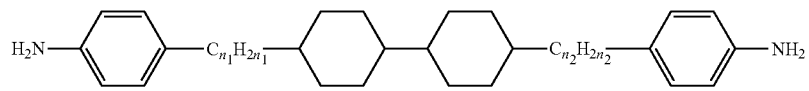
(6)

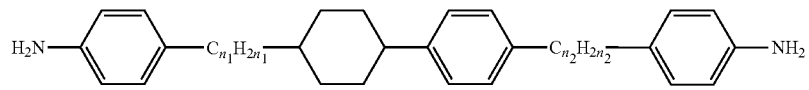
(7)

In the formulas (2) to (7), $n_1$ and $n_2$ are each independently 2 or 3.

Another aspect of the present invention may be a liquid crystal alignment film containing: a polyimide compound represented by the following formula (8), which is an imidization product of the polymer in the liquid crystal alignment agent. This aspect achieves a liquid crystal alignment film capable of exhibiting its liquid crystal alignment performance without sublimation of the decomposition products.

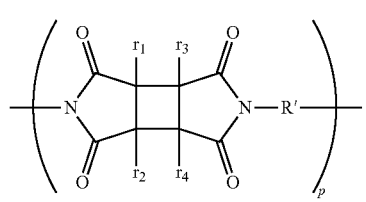
(8)

In the formula (8), $r_1$, $r_2$, $r_3$, and $r_4$ are each independently a hydrogen atom or a C1-C4 alkyl, p represents the number of repetitions and is an integer of 1 or greater, and R' is any one of structures represented by the following formulas (9) to (14).

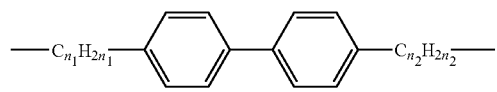
(9)

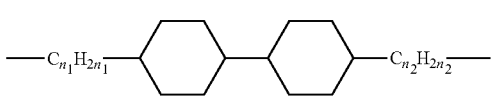
(10)

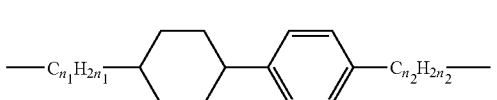
(11)

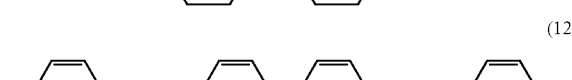
(12)

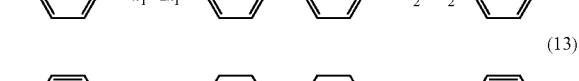
(13)

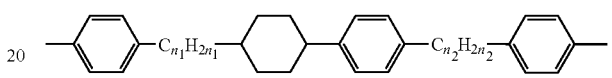
(14)

In the formulas (9) to (14), $n_1$ and $n_2$ are each independently 2 or 3.

Yet another aspect of the present invention may be a liquid crystal display device including: a pair of substrates; a liquid crystal layer held between the substrates; and the liquid crystal alignment film disposed between at least one of the substrates and the liquid crystal layer. This aspect achieves a liquid crystal display device including the liquid crystal alignment film capable of exhibiting its liquid crystal alignment performance without sublimation of the decomposition products.

In the yet another aspect of the present invention, a maleimide compound which is a decomposition product of the polyimide compound may be dissolved in the liquid crystal layer. This enables the liquid crystal alignment film to exhibit its liquid crystal alignment performance without sublimation of the maleimide compounds as the decomposition products.

In the yet another aspect of the present invention, 0.1 to 0.5 vol % of the maleimide compound may be dissolved in 100 vol % of the liquid crystal layer. This enables the liquid crystal alignment film to exhibit its liquid crystal alignment performance sufficiently even when the amount of the maleimide compounds dissolved is small as described above.

In the yet another aspect of the present invention, the liquid crystal layer may be formed from a positive liquid crystal material having positive anisotropy of dielectric constant. This enables the above maleimide compounds dissolved in the liquid crystal layer to behave efficiently like liquid crystal molecules as neutral liquid crystal components even when the material of the liquid crystal layer is a positive liquid crystal material.

In the yet another aspect of the present invention, the liquid crystal layer may be formed from a negative liquid crystal material having negative anisotropy of dielectric constant. This enables the above maleimide compounds dissolved in the liquid crystal layer to behave efficiently like liquid crystal molecules as neutral liquid crystal components even when the material of the liquid crystal layer is a negative liquid crystal material.

In the yet another aspect of the present invention, the liquid crystal display device may be in a display mode of an IPS mode or an FFS mode. This achieves an IPS mode or FFS mode liquid crystal display device including a liquid crystal alignment film capable of exhibiting its liquid crystal alignment performance without sublimation of the decomposition products.

What is claimed is:

1. A liquid crystal alignment film comprising:
a polyimide compound represented by the following formula (8),

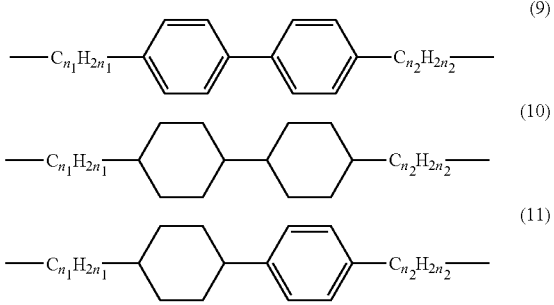

wherein $r_1$, $r_2$, $r_3$, and $r_4$ are each independently a hydrogen atom or a C1-C4 alkyl, p represents the number of repetitions and is an integer of 1 or greater, and R' is any one of structures represented by the following formulas (9) to (14),

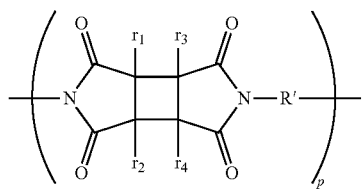

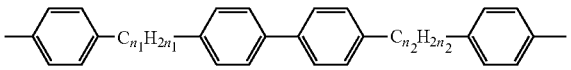

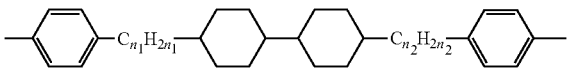

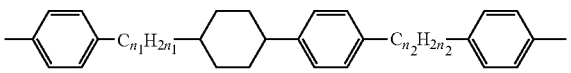

wherein $n_1$ and $n_2$ are each independently 2 or 3.

2. A liquid crystal display device comprising:
a pair of substrates;
a liquid crystal layer held between the substrates; and
the liquid crystal alignment film according to claim 1 disposed between at least one of the substrates and the liquid crystal layer.

3. The liquid crystal display device according to claim 2, wherein a maleimide compound which is a decomposition product of the polyimide compound is dissolved in the liquid crystal layer.

4. The liquid crystal display device according to claim 3, wherein 0.1 to 0.5 vol % of the maleimide compound is dissolved in 100 vol % of the liquid crystal layer.

5. The liquid crystal display device according to claim 3, wherein the liquid crystal layer is formed from a positive liquid crystal material having positive anisotropy of dielectric constant.

6. The liquid crystal display device according to claim 3, wherein the liquid crystal layer is formed from a negative liquid crystal material having negative anisotropy of dielectric constant.

7. The liquid crystal display device according to claim 2, which is in a display mode of an IPS mode or an FFS mode.

* * * * *